United States Patent [19]
Schleupen et al.

[11] Patent Number: 5,996,398
[45] Date of Patent: Dec. 7, 1999

[54] DEVICE FOR KNOCK DETECTION IN INTERNAL COMBUSTION ENGINE

[75] Inventors: Richard Schleupen, Grossingersheim; Joerg Bonitz, Muehlacker; Stephan Hartmann, Schwieberdingen; Juergen Foerster, Chemnitz, all of Germany

[73] Assignee: Robert Bosch GmbH, Stuttgart, Germany

[21] Appl. No.: 08/696,328

[22] Filed: Aug. 13, 1996

Related U.S. Application Data

[63] Continuation of application No. 08/308,844, Sep. 19, 1994, abandoned, which is a continuation of application No. 08/087,686, Jul. 2, 1993, abandoned.

[30] Foreign Application Priority Data

Jan. 22, 1992 [DE] Germany .............................. 42 01 567

[51] Int. Cl.⁶ .................................................. G01L 23/22
[52] U.S. Cl. ............................................................ 73/35.05
[58] Field of Search ................................. 73/35.01, 35.03, 73/35.04, 35.05, 35.06, 35.11; 123/425, 435

[56] References Cited

U.S. PATENT DOCUMENTS

| 4,899,710 | 2/1990 | Takahashi | 73/35.01 |
| 5,146,777 | 9/1992 | Polito et al. | 73/35.05 |
| 5,408,863 | 4/1995 | Sawyers et al. | 73/35.05 |

*Primary Examiner*—Hezron Williams
*Assistant Examiner*—Helen C. Kwok
*Attorney, Agent, or Firm*—Michael J. Striker

[57] ABSTRACT

A device for detecting a knocking in an internal combustion engine has an evaluating facility, a knock sensor for sensing knocking of an internal combustion engine and producing output signals of the knocking sensor, an evaluation facility for obtaining the filtered signals from the filter from the devices and evaluating the same and a device for controlling a center frequency of at least one of the filter devices depending on at least one operating parameter of the internal combustion engine.

5 Claims, 2 Drawing Sheets

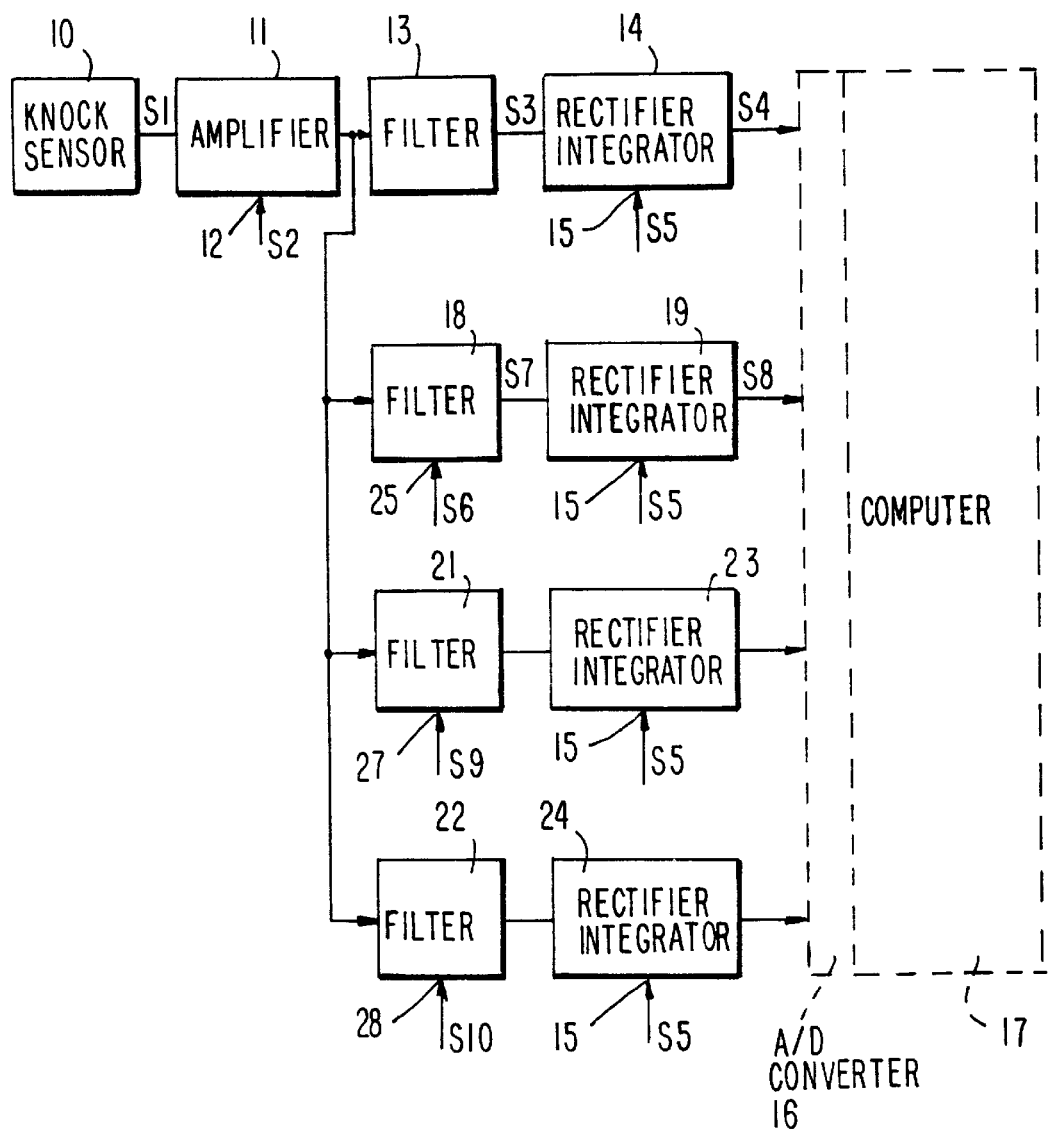

DEVICE FOR KNOCK DETECTION IN INTERNAL COMBUSTION ENGINE

This is a continuation of application Ser. No. 08/308,844 filed Sep. 19, 1994, abandoned which in turn is a continuation of application Ser. No. 08/087,686 filed on Jul. 2, 1993, abandoned.

BACKGROUND OF THE INVENTION

The present invention relates to a device for a knock detection in an internal combustion engine.

More particularly, it relates to such a device, in which a knock sensor is linked via filter devices to an evaluation facility.

Devices for identifying knocking in internal combustion engines commonly have filters to which the output signals of a knock sensor are fed and which extract from these signals the frequency portions which are typical of knocking combustion. In a subsequent comparison arrangement, knocking is detected from these frequency portions when the signal portions which are typical of knocking are higher than the background signals ascertained from the entire signal spectrum or from the signal spectrum without portions typical of knocking.

A device or a method for detecting knocking and which embraces the named methods, is known from the DE-OS 33 42 466. To improve the reliability of knock detection, the output signal of the knock sensor of the known device or the known method is additionally amplified in an controllable amplifier, prior to filtering, so that the signal level remains approximately constant, independent of the number of revolutions. It is further proposed to configure the filter as a digital filter, with the facility that the transfer function of the digital filter can be selected dependent on the number of revolutions or on the load, by influencing the filter factor k.

However, the known device or the known method has the disadvantage that a frequency drift which may possibly occur is not taken into consideration, which makes a reliable knock detection more difficult.

SUMMARY OF THE INVENTION

Accordingly, it is an object of the present invention to provide a device for knock detection in an internal combustion engine which avoids the disadvantages of the prior art.

In keeping with these objects and with others which will become apparent hereinafter, one feature of the present invention resides, briefly stated, in a device for detecting knocking in an internal combustion engine by means of a knock sensor which is linked via filter devices to an evaluation facility, in which in accordance with the present invention a center frequency of at least one filter device is controllable depending on one or more operating parameters of the internal combustion engine.

When the device is designed in accordance with the present invention, it has the advantage that the controllable centre frequency of the filter devices enables an adaptation of these filter devices to the occurring frequency drifts of the knock signal. This follow-up of the centre frequency allows an improvement of the signal-to-noise ratio to be achieved which ensures particularly advantageous knock detection.

Further advantages can be achieved if instead of a single filter a number of filters are connected in parallel and each centre frequency of these filters is followed up. This follow-up of the centre frequency of the individual filters in relation to the engine operating parameters, for example of the crank angle, the load or the combustion chamber pressure, or the engine speed, particularly enables a further increase in the reliability of knock detection to be achieved. In this endeavour, the follow-up of the centre frequency by means of a microcomputer, which controls the frequency of resonance of a filter, is of particular advantage.

Due to the fact that the change of frequency and/or phase of the processed output signal of the knock sensor is continuously detected and that the change of frequency can be evaluated for knock detection, the signal-to-noise ratio in relation to background noises can be advantageously increased.

In accordance with further features of the present invention, the operating parameters can be the crankshaft position, the speed, the load, the combustion chamber pressure, or any combination of these variables.

The center frequency of the filter device can be adjustable within a combustion cycle. Also, in accordance with another embodiment, the center frequency can be controllable by a computer. The control can be also carried out via the clock frequency of a switchboard capacitor filter.

The evaluation facility can also comprise a computer.

In accordance with a further feature of the present invention, the frequency and/or phase of the output signal of the knock sensor can be continuously determined, and the change of frequency can be evaluated for the purpose of knock detection.

Finally, a frequency and/or phase detector can be provided to which the output signal of the knock sensor can be fed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 2 to 4 show three embodiment examples of the invention.

DESCRIPTION OF PREFERRED EMBODIMENTS

Figure 1:
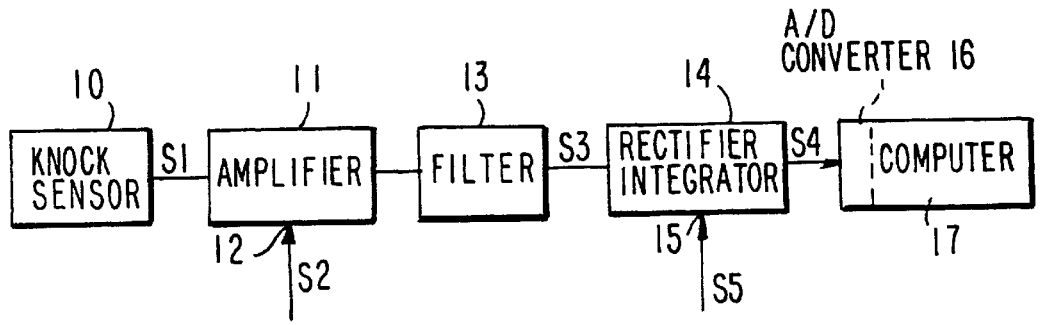
FIG. 1 shows a device for knock detection such as is known, for example, from the DE-OS 33 42 466.

In the known device for knock detection in accordance with FIG. 1, a knock sensor 10, for example a sensor for structure-borne noise which supplies the output signals S1, is connected via an amplifier 11, a filter 13, and a rectifier and integrator 14, to the analog/digital converter 16 of a computer 17, for example a microcomputer.

The amplification of the amplifier 11 can be controlled or regulated, relevant signals S2 which are supplied by the computer 17 for example are then fed via an input 12.

The filter 13 has a fixed centre frequency fm which is fixed such that the signal portions caused by knocking are allowed to pass through, whereas the signal portions with other frequencies are filtered out.

The rectifier and integrator 14 utilize the signal S3 supplied by the filter 13 only during a measuring window and forms from it a voltage S4 which after A/D conversion is compared for knock detection in the computer 17 with a background signal, whereby knocking is detected when the comparison meets a presettable condition.

Signals S5 which fix the duration of the measuring window and its position in relation to the position of the crankshaft, are fed via the input 15, these signals S5 are formed in the computer 17 dependent on the crankshaft position.

It has been shown that the frequency of signals which originate from knocking, will shift dependent on certain parameters of the internal combustion engine. For example, the frequency of the knock signal which occurs after top dead centre (TDC) decreases as the crankshaft angle increases. In recordings of the structure-borne signals of a knock sensor, a frequency drift correlated to the piston movement has been observed. This fact is utilized by the equipment in accordance with this invention.

By follow-up of the centre frequency of a selection filter corresponding to the frequency drift (chirp), it is possible to achieve a marked improvement of the signal-to-noise ratio. The filter is designed such that it allows those signals to pass which are characteristic of knock.

Figure 2:
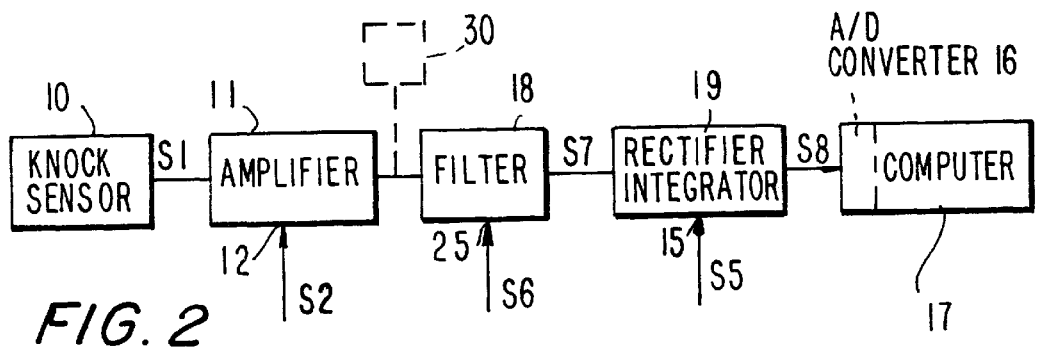

FIG. 2 shows a first embodiment of the invention which has the same elements 10 to 17 as the known device for knock detection according to FIG. 1 which also function in the manner described in connection with the device of FIG. 1 and which supply signals or interact with signals which partly carry the designations given in FIG. 1. Instead of the filter 13, the first embodiment example of the invention has a filter 18 with a variable-centre frequency fm1, to which control signals S6 are fed via an input 25, and which outputs signals S7 to the rectifier and integrator designated 19.

The control signals S6 control the centre frequencies fm1 of the filter 18 in a presettable range. The control signals are produced in the computer 17 and are intended to shift the centre frequency fm1 of the filter 18 such that in all operating ranges of the engine it is positioned so as to enable an optimum knock detection and so that the signal-to-noise ratio is of the maximum.

The control or displacement of the centre frequency fm1 is carried out by means of the computer 17, for example a microcomputer, via the clock frequency of a switched capacitor filter which can be arranged as a coilless integrable filter. The control can be implemented such that the centre frequency fm1 is a function of individual, several, or a combination of engine parameters. These parameters are mainly the momentary crank angle positions, the load or the combustion chamber pressure, and the speed.

In the embodiment example according to FIG. 2, knock detection is facilitated by feeding the signal S8 to the computer 17, to which further information as to the engine condition is supplied, this signal S8 has been produced by the rectifier and integrator 19 and is then compared in the computer with a background signal, when the background signal is exceeded, this signifies knocking, and the computer 17 initiates suitable action such as altering the ignition angle in order to eliminate knock.

Since the centre frequency fm1 of the filter 18 is controlled by the computer 17, taking into account the prevailing operating conditions, it is ensured that the signal portions caused by knocking and relevant to knock detection of the suitably amplified output signal S1 of the knock sensor 10 are particularly clearly separated from the remaining signal portions.

Figure 3:
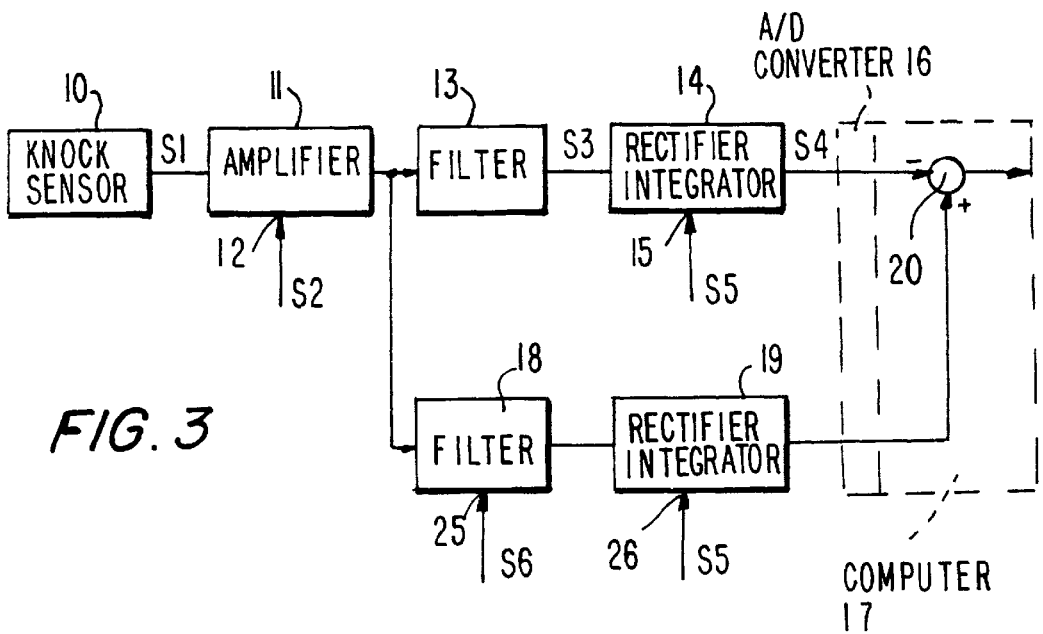

FIG. 3 shows a further embodiment example of the invention which comprises a combination of the elements already specified in FIGS. 1 and 2, in which the filter 13 with the constant centre frequency and the following controlled rectifier and integrator 14 are parallel with the filter 18 with controlled centre frequency and the following controlled rectifier and integrator 19.

In the embodiment example according to FIG. 3, the signal supplied by the knock sensor 10 and suitably amplified in the amplifier 11, is on the one hand fed via the filter 18 with controllable centre frequency fm1 and the following rectifier and integrator 19 to the computer 17 and, on the other hand, via filter 13 with constant centre frequency fm and the rectifier and integrator 14, also fed to the computer 17.

In the computer 17, the difference of the differently filtered output signals of the knock sensor is formed in point 20 which is shown as a summation point. If this difference D is above a presettable threshold value, this is recognized as knock and is indicated, or actions to eliminate knocking is initiated by the computer 17.

In the embodiment example according to FIG. 4, several filters 13, 18, 21, 22 are provided which are in parallel to one another. The filter 13 has a constant centre frequency fm, while the filters 18, 21 and 22 have controlled centre frequencies fm1, fm2, fm3 which are all variable within a presettable range.

The drive of filters 18, 21, 22 or, if applicable, further filters, is triggered by the computer 17 and takes place by coupling-in of control signals S6, S9, S10 via relevant inputs 25, 27, 28 so that frequency shifts, if necessary, can take place independently of one another.

The filters 13, 18, 21 and 22 are connected to the computer 17 via rectifiers and integrators 14, 19, 23 and 24, with an analog/digital converter being interposed which is generally designated 16. The input via which the control signals designated S5 are fed to the rectifiers and integrators 14, 19, 23 and 24, is generally designated 15.

In the device according to FIG. 4, the variable centre frequencies of filters 18, 21 and 22 are adapted to the different vibration modes f1, f2, . . . fn in the combustion chamber, so that the centre frequencies fm1, fm2, . . . fmn correspond to these frequencies. The vibration modes f1, f2, . . . fn represent the harmonics of a first harmonic f which is caused by knocking of the internal combustion engine.

Adaptation to the centre frequencies is controlled by the computer 17, for example via the clock frequency of a switched capacitor filter, with the follow-up centre frequencies fm1, fm2, . . . fmn in turn being dependent on single, several, or combinations of engine operating parameters and these parameters being mainly the momentary crank angle position, the load or the combustion chamber pressure, and the speed.

The evaluation of the individual signals which pass to the computer 17 via filters and rectifiers and integrators, is carried out in the computer; knock is identified when the detection criteria in accordance with FIG. 2 or 3 are met for one or several branches with the centre frequencies fm.

The forming of the measuring windows, during which the rectifiers and integrators 14, 19, 23 and 24 operate, is determined by the computer 17 dependent on the crankshaft angle or the speed or the load.

For the frequency analysis, the devices presented in FIGS. 2 to 4 may have additional frequency or phase detectors which determine the frequency and phase of the sensor output signals. For this purpose, the sensor output signal processed in the amplifier 11 for example, is isolated, and fed to the frequency or phase detector 30.

It will be understood that each of the elements described above, or two or more together, may also find a useful application in other types of constructions differing from the types described above.

While the invention has been illustrated and described as embodied in a device for detecting knocking in an internal combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for detecting knocking in an internal combustion engine, comprising a knocking sensor for sensing knocking of said internal combustion engine and producing output signals; filter devices for filtering the output signals of said knocking sensor; an evaluation facility for obtaining the filtered signals from said devices and evaluating said filtered signals; means for continuously determining at least one of a frequency and a phase of the output signals of said knock sensor, said evaluation facility evaluating a change of the frequency for the purpose of the knock detection; and means for controlling a center frequency of at least one of said filter devices depending on a crankshaft angle, said controlling means controlling the center frequency of said at least one of filter device within a combustion cycle of the internal combustion engine so that the center frequency of said at least one filter device reduces in response to an increase of the crankshaft angle.

2. A device as defined in claim 1, wherein said filter devices include a plurality of parallel filters, said controlling means controlling the center frequency of said parallel filters.

3. A device as defined in claim 1, wherein said evaluation facility includes a computer.

4. A device as defined in claim 1, wherein said controlling means includes a computer which controls the center frequency of said at least one of said filter devices.

5. A device as defined in claim 1, wherein said controlling means includes a switched capacitor filter so that said controlling means control the center frequency of said at least one of said filter devices via a clock frequency of said switched capacitor filter.

* * * * *